United States Patent
Maris (10) Patent No.: US 7,587,102 B2
(45) Date of Patent: Sep. 8, 2009

(54) METHOD AND APPARATUS FOR PERFORMING A SENSOR FUSION TO PROVIDE A POSITION OF A TARGET-OF-INTEREST

(75) Inventor: John M. Maris, St-Bruno (CA)

(73) Assignee: Marinvent Corporation, Québec (CA)

( * ) Notice: Subject to any disclaimer, the term of this patent is extended or adjusted under 35 U.S.C. 154(b) by 731 days.

(21) Appl. No.: 11/332,487

(22) Filed: Jan. 17, 2006

(65) Prior Publication Data
US 2006/0239559 A1 Oct. 26, 2006

Related U.S. Application Data (60) Provisional application No. 60/644,003, filed on Jan. 18, 2005.

(51) Int. Cl.
G06K 9/36 (2006.01)
G06K 9/18 (2006.01)
(52) U.S. Cl. .................................. 382/291; 382/183
(58) Field of Classification Search ................ 382/107, 382/183, 291, 312; 701/200
See application file for complete search history.

(56) References Cited

U.S. PATENT DOCUMENTS

| | | | |
|---|---|---|---|
| 3,683,380 A | 8/1972 | Cantwell, Jr. et al. | |
| 3,831,174 A | 8/1974 | King et al. | |
| 3,940,762 A | 2/1976 | Ethington et al. | |
| 4,025,919 A | 5/1977 | Jefferies et al. | |
| 5,005,147 A | 4/1991 | Krishen et al. | |
| 5,307,289 A | 4/1994 | Harris | |
| 5,414,643 A | 5/1995 | Blackman et al. | |
| 5,519,618 A | 5/1996 | Kastner et al. | |
| 5,537,118 A | 7/1996 | Appriou | |
| 5,581,490 A | 12/1996 | Ferkinhoff et al. | |
| 5,959,571 A | 9/1999 | Aoyagi et al. | |
| 6,026,340 A | 2/2000 | Corrado et al. | |
| 6,278,401 B1 | 8/2001 | Wigren | |
| 6,304,833 B1 | 10/2001 | Ferkinhoff et al. | |
| 6,374,197 B1 | 4/2002 | Ganesh et al. | |
| 6,499,025 B1 | 12/2002 | Horvitz et al. | |
| 6,594,201 B2 | 7/2003 | Barnard et al. | |
| 6,704,619 B1 * | 3/2004 | Coleman et al. | 700/245 |

(Continued)

FOREIGN PATENT DOCUMENTS

EP  1 070 968  5/2004

(Continued)

*Primary Examiner*—Kanji Patel
(74) *Attorney, Agent, or Firm*—Ogilvy Renault LLP (57) ABSTRACT

A method and apparatus are disclosed for estimating a position of a target of interest using a plurality of position detection sensors wherein for at least one of the sensors, a corresponding time-variant detection probability profile is combined with the detection status received from the sensor and further wherein each of the corresponding detection probability profiles is combined to generate a global detection probability profile, wherein the combining comprises probabilistically adding a first given probability profile in the case where a first given corresponding indication comprises a target detection and probabilistically subtracting a second given probability profile in the case where a corresponding second given indication comprises a target non-detection and wherein the position of the target is estimated using the highest probability region(s) of the generated global detection probability profile.

19 Claims, 9 Drawing Sheets

U.S. PATENT DOCUMENTS

| | | |
|---|---|---|
| 6,882,959 B2 | 4/2005 | Rui et al. |
| 2003/0081503 A1 | 5/2003 | Barnard et al. |
| 2004/0243344 A1 | 12/2004 | Kronhamn et al. |

FOREIGN PATENT DOCUMENTS

| | | |
|---|---|---|
| WO | WO2004/046748 | 6/2004 |
| WO | WO2005/022090 | 3/2005 |

\* cited by examiner

FIGURE 9

METHOD AND APPARATUS FOR PERFORMING A SENSOR FUSION TO PROVIDE A POSITION OF A TARGET-OF-INTEREST

CROSS-REFERENCE TO RELATED APPLICATIONS

This application claims priority under 35USC§119(e) of U.S. provisional patent application 60/644,003, entitled "Method and apparatus for performing a sensor fusion to provide a position of a target of interest" that was filed on Jan. 18, 2005, the specification of which is hereby incorporated by reference.

TECHNICAL FIELD

This invention relates to the field of identifying/tracking a target-of-interest (TOI). More precisely, this invention relates to the fusion of disparate information from multiple position detection sensors to yield a best estimate of the true position of the target-of-interest (TOI), taking particular advantage of sensor that lack contact with the target.

BACKGROUND OF THE INVENTION

Several methods have been implemented, familiar to one versed in the art, for integrating the information from multiple sensors to arrive at such a best estimate. For example, Kalman filtering is one technique that is used to iteratively derive the best estimate of a vehicle's position from different navigation sensors, while simultaneously determining the error components of each sensor. Such techniques share one precept: information is only incorporated in the solution from those sensors that have a detection, or "Hit" from the target. One familiar with the art of Signal Detection Theory (SDT) will recognize that a "Hit" is only one of four possible outcome permutations between a sensor and a target:

"HIT": The sensor correctly detects the presence of a target;

"MISS": The sensor fails to detect a target that is present;

"FALSE ALARM (FA)": The sensor falsely detects a target where one does not exist;

"CORRECT REJECTION (CR)": The sensor correctly determines that no target is present.

The signal detection theory provides statistical methods for addressing sensitivity thresholds that govern the balance between the "miss" and "false alarm" cases. By definition, there is no definitive way to distinguish between a "Hit" and a "false alarm" from a single sensor; if there were, the event would never be categorized as a "false alarm". Similarly, there is no way to discriminate between a "Correct rejection" and a "miss", from a single sensor, otherwise, there would never be any "miss" classifications.

There is a need for a method and apparatus that will overcome the above-identified drawbacks.

SUMMARY OF THE INVENTION

It is an object of the invention to provide a method and apparatus for identifying the true position of a target of interest using a plurality of position detection sensors.

It is another object of the invention to provide a method and apparatus for tracking the true position of a target of interest using a plurality of position detection sensors.

According to a first aspect of the invention, there is provided a method for generating a global detection probability profile for a target using a plurality of sensors, the method comprising for at least one of the sensors, receiving a detection status (HIT or CORRECT REJECTION) from the sensor and retrieving a corresponding detection probability profile, wherein the corresponding detection probability profile comprises a time-variant three-dimensional distribution defining the sensor's possible detection envelope and the computed probability of detection of the target of interest corresponding to each region of the envelope and combining each of the corresponding detection probability profile to generate the global detection probability profile, the combining comprising probabilistically adding first given probability profile in the case where a first given corresponding indication comprises a target detection, and probabilistically subtracting a second given probability profile in the case where a corresponding second given indication comprises a target non-detection.

When a large number of sensors is used, a useful approximation for the probability of a target-of-interest detection at a specific point may be achieved by weighting and numerically summing the detection probability profiles at that point, although this simplification does not preclude the rigorous application of probability theory where warranted. The methods for combining probabilities are well known to those skilled in the art, and will not be repeated here, but the words "adding" and "subtracting" are deemed to include the full probabilistic addition and subtraction as well as the simple arithmetic summation and difference operators. Graphically, the combination of the detection probability profiles may be visualized by the superimposition of the individual detection probability profile patterns. A key feature of the detection probability profile combination is that serviceable sensors that do not have a "Hit" are assumed to have a "Correct rejection" and their detection probability profile profiles are subtracted from the total detection probability profile field.

According to another aspect of the invention, there is provided a method for estimating a position of a target of interest using a plurality of position detection sensors, the method comprising for at least one of the sensors, receiving a detection status from the sensor and obtaining a detection probability profile corresponding to the sensor, wherein the corresponding detection probability profile comprises a time-variant three-dimensional distribution defining the sensor's possible detection envelope and the computed probability of detection of the target of interest corresponding to each region of the envelope; combining each of the corresponding detection status and the detection probability profiles to generate a global detection probability profile, the combining comprising probabilistically adding a first given probability profile in the case where a first given corresponding indication comprises a target detection, and probabilistically subtracting a second given probability profile in the case where a corresponding second given indication comprises a target non-detection and estimating the position of the target corresponding to the highest probability region(s) in the generated global detection probability profile.

According to another aspect of the invention, there is provided an apparatus for providing a global detection probability profile for a target of interest using inputs from a plurality of sensors, the apparatus comprising a probability profile providing unit for providing a plurality of detection probability profile signals for the target, wherein each of the corresponding detection probability profile signals comprises a time-variant three-dimensional distribution defining the sensor's possible detection envelope and the computed probability of detection of the target of interest corresponding to each region of the envelope and a processing unit combining sensor detection status information from each sensor with the corresponding plurality of detection probability profile signals and combining each of the corresponding detection probability profile signals to generate a global detection probability profile signal, the combining comprising probabilistically adding a first given probability profile signal in the case where a first given corresponding indication comprises a target detection, and probabilistically subtracting a second given probability profile signal in the case where a corresponding second given indication comprises a target non-detection.

According to a further aspect of the invention, there is provided an apparatus for providing an estimation of a position of a target of interest using inputs from a plurality of position detection sensors, the apparatus comprising a probability profile providing unit for providing a plurality of detection probability profile signals corresponding to each sensor, wherein each of the corresponding detection probability profile signals comprises a time-variant three-dimensional distribution defining the sensor's possible detection envelope and the computed probability of detection of the target of interest corresponding to each region of the envelope, a processing unit receiving sensor detection status information and the provided plurality of detection probability profile signals and combining each of the corresponding detection probability profile signals to generate a global detection probability profile signal, the combining comprising probabilistically adding a first given probability profile signal in the case where a first given corresponding indication comprises a target detection, and probabilistically subtracting a second given probability profile signal in the case where a corresponding second given indication comprises a target non-detection and a position estimating unit receiving the global detection probability profile signal and estimating the position of the target using at least said received global detection probability profile to provide the estimation of the position of the target of interest.

According to a further aspect of the invention, there is provided a method for estimating a position of a target of interest using a plurality of position detection sensors wherein a loss of contact with the target is detected for a given sensor, the method comprising estimating for the given sensor a corresponding time-variant detection probability profile comprising a three-dimensional distribution defining the given sensor's possible detection envelope and the computed probability of detection of the target of interest corresponding to each region of the envelope, providing for other sensors a corresponding detection probability profile comprising a three-dimensional distribution defining the other sensor's possible detection envelope and the computed probability of detection of the target of interest corresponding to each region of the envelope, combining each of the corresponding detection probability profiles to generate a global detection probability profile, the combining comprising probabilistically adding a first given probability profile in the case where a first given corresponding indication comprises a target detection, and probabilistically subtracting a second given probability profile in the case where a corresponding second given indication comprises a target non-detection and estimating the position of the target corresponding to the highest probability region(s) using the generated global detection probability profile.

In this specification, the term "adding" is intended to mean "probabilistically adding" and "subtracting" is intended to mean "probabilistically subtracting".

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION OF THE PREFERRED EMBODIMENT

Figure 1:
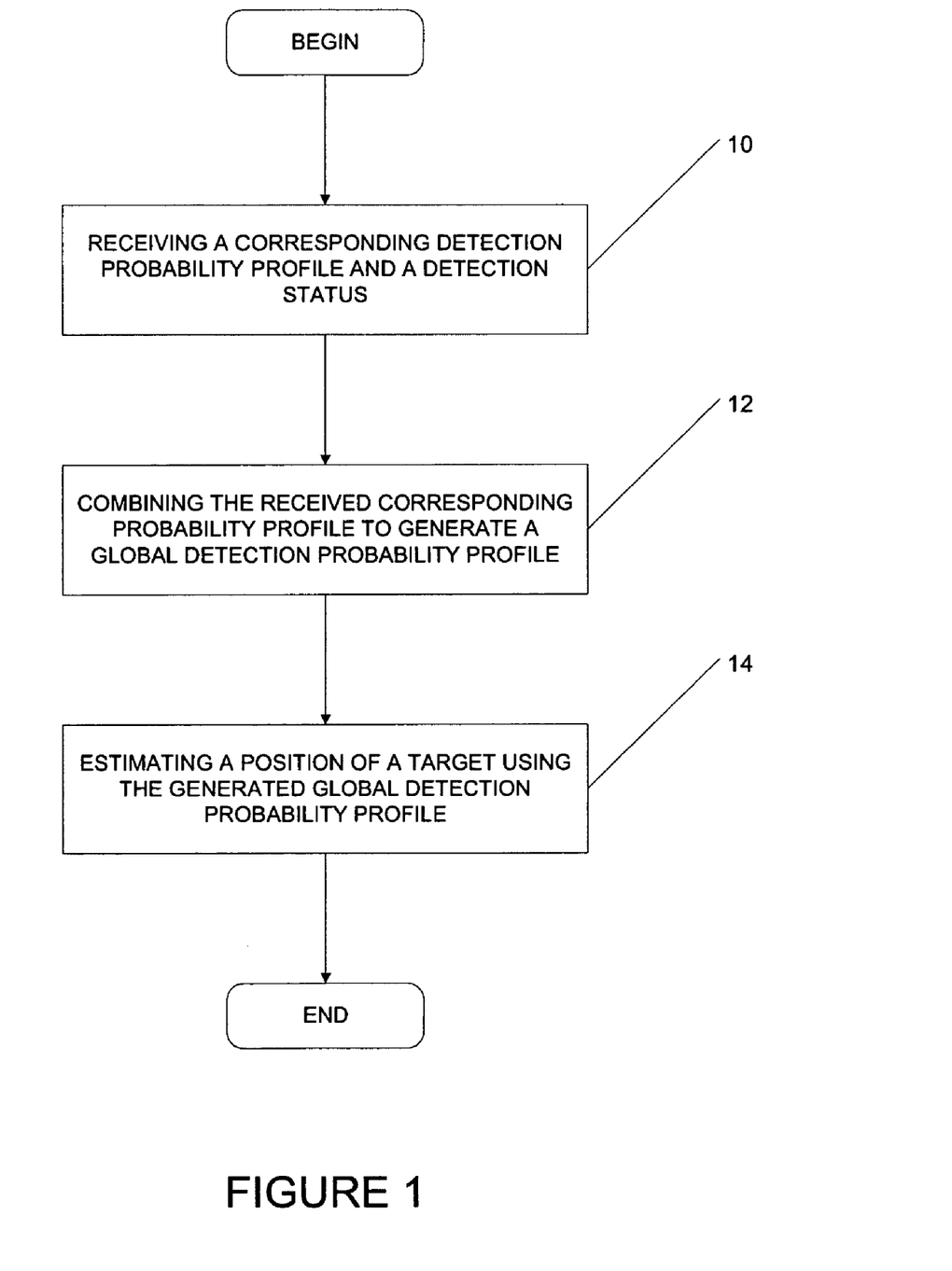
FIG. 1 is a flowchart which shows one embodiment for estimating a position of a target; according to a first step a corresponding detection probability profile and a detection status are received; according to a second step the received corresponding probability profiles are combined to generate a global detection probability profile and according to a third step the position is estimated using the generated global detection probability profile.

Now referring to FIG. 1, there is shown an embodiment for estimating a position of a target of interest using a plurality of sensors.

According to step 10, for each sensor, a corresponding detection probability profile and a detection status are received. In one embodiment, the corresponding detection probability profile comprises a 3-dimensional distribution defining the sensor's possible detection envelope and a computed probability of detection of the target of interest corresponding to each region of the envelope.

It will be appreciated that a three-dimensional Detection-Probability Profile (DPP) is used for each sensor of the plurality of sensors and a time-based function that determines the change of this profile with time, if applicable.

For example, it is known to a skilled addressee that a vertical dipole radio antenna exhibits a roughly circular detection probability profile, with an inverse-square law governing the drop-off in detection probability with increasing distance from the antenna. More complex antennas exhibit Cardioid or other detection probability profiles, familiar to those versed in the art.

The detection probability profile in the dipole case is time-invariant, as the detection probability is not inherently affected by time. Conversely, a simple radar system has a time-dependent detection probability profile uncertainty generated by any uncompensated target motion between radar sweeps. The time function in this case would be a saw-tooth, with a small but steadily increasing error which returns to its minimum bounded value with each successive hit. An extreme example of the time function would be a satellite detection of a moving target-of-interest. The satellite provides a very precise estimate of the position of a target-of-interest during its over-flight, but the relatively long revisit time results in a sizeable error accumulating between passes, to the extent that the target may actually be lost. All electronic, optical, acoustic, and similar sensors possess such detection characteristics, with the time function accounting for any staleness of the sensor's information.

The detection probability profiles shown in FIGS. 3 to 7 are for illustrative purposes and are not intended to be an exhaustive list of all possible profiles.

The figures indicate two-dimensional detection probability profiles with the shading indicating the probability at each point in the detection probability profile. They comprise "before" and "after" snapshots for each profile, with the latter indicating the dilation of the probability distribution (i.e. increasing positional uncertainty) with the passage of time since the last sensor "hit" or "correct rejection". For clarification, FIGS. 3-6 include a sample probability distribution across the cross-section of the detection probability profile. The detection probability profiles can extend to three dimensions, and every point in the detection probability profile would still have an associated probability, although this cannot be easily portrayed graphically.

Figure 3:
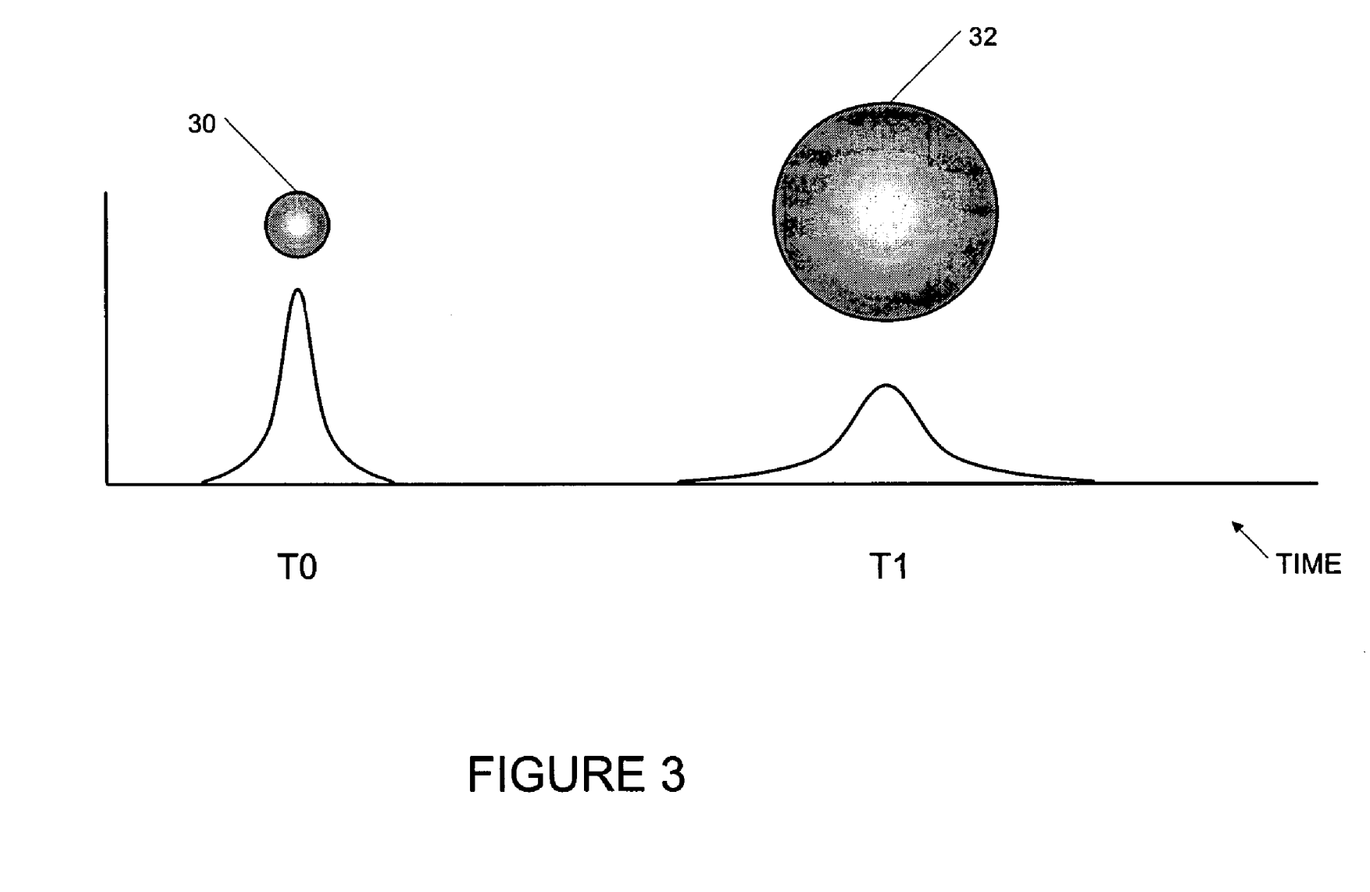
FIG. 3 illustrates an example of an evolution through time of a detection probability profile comprising a circular normally-distributed pattern, centered around the sensor's position; such a distribution may be representative of a vertical dipole radio antenna.

Referring now to FIG. 3, there is illustrated a common and representative detection probability profile comprising a circular normally-distributed pattern 30, centered around the position of the sensor at an instant T0. FIG. 3 further shows a circular normally-distributed pattern 32, centered around the position of the sensor at an instant T1. Such a distribution may be representative of a vertical dipole radio antenna.

Figure 4:
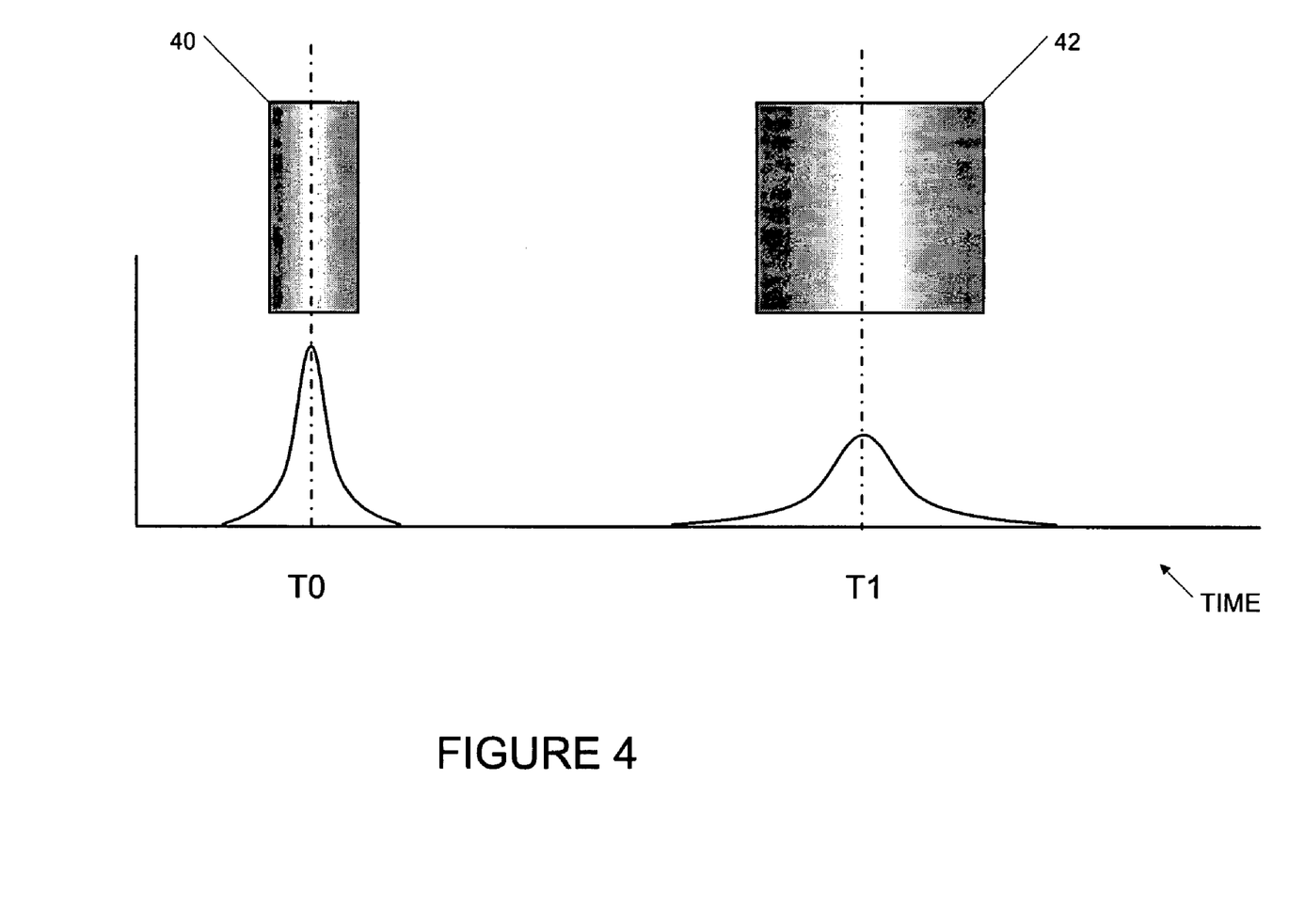
FIG. 4 shows an example of an evolution through time of a normally-distributed detection probability profile centered on a linear sensor pattern, such a distribution may be representative of a satellite ground swath.

Referring now to FIG. 4, there is shown a normally-distributed zdetection probability profile 40 at an instant T0 centered on a linear sensor pattern. FIG. 4 further shows a normally-distributed detection probability profile 42 at instant T1. Such a distribution may be representative of a satellite ground swath for example.

Figure 5:
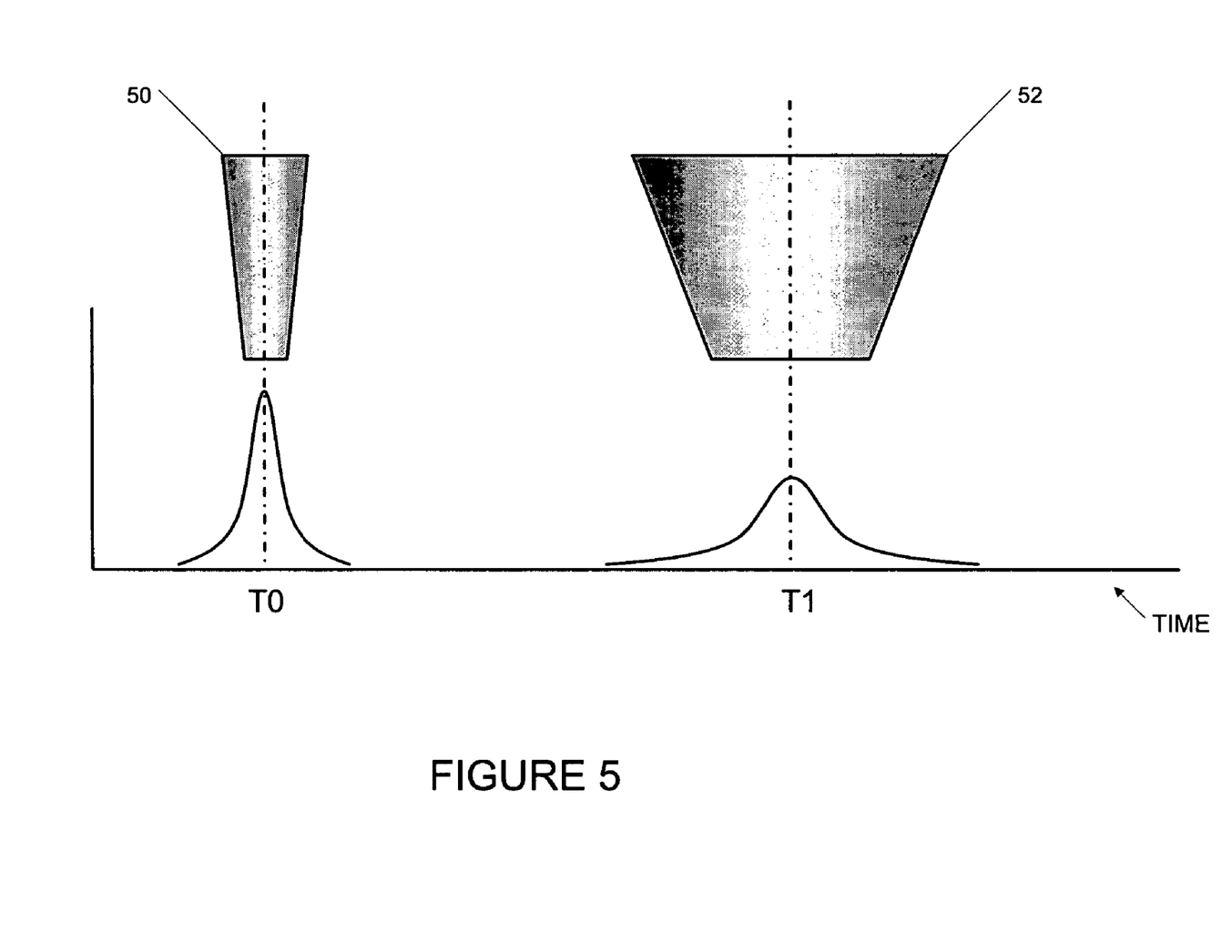
FIG. 5 illustrates an example of an evolution through time of a normally-distributed pattern centered on a radial from an angular sensor, such distribution may be provided by a directional microphone.

Similarly, FIG. 5 illustrates a normally-distributed detection probability profile 50 at an instant T0 centered on a radial from an angular sensor. FIG. 5 further shows a normally-distributed detection probability profile 52 at an instant T1. Such a distribution may be representative of a directional microphone.

Figure 6:
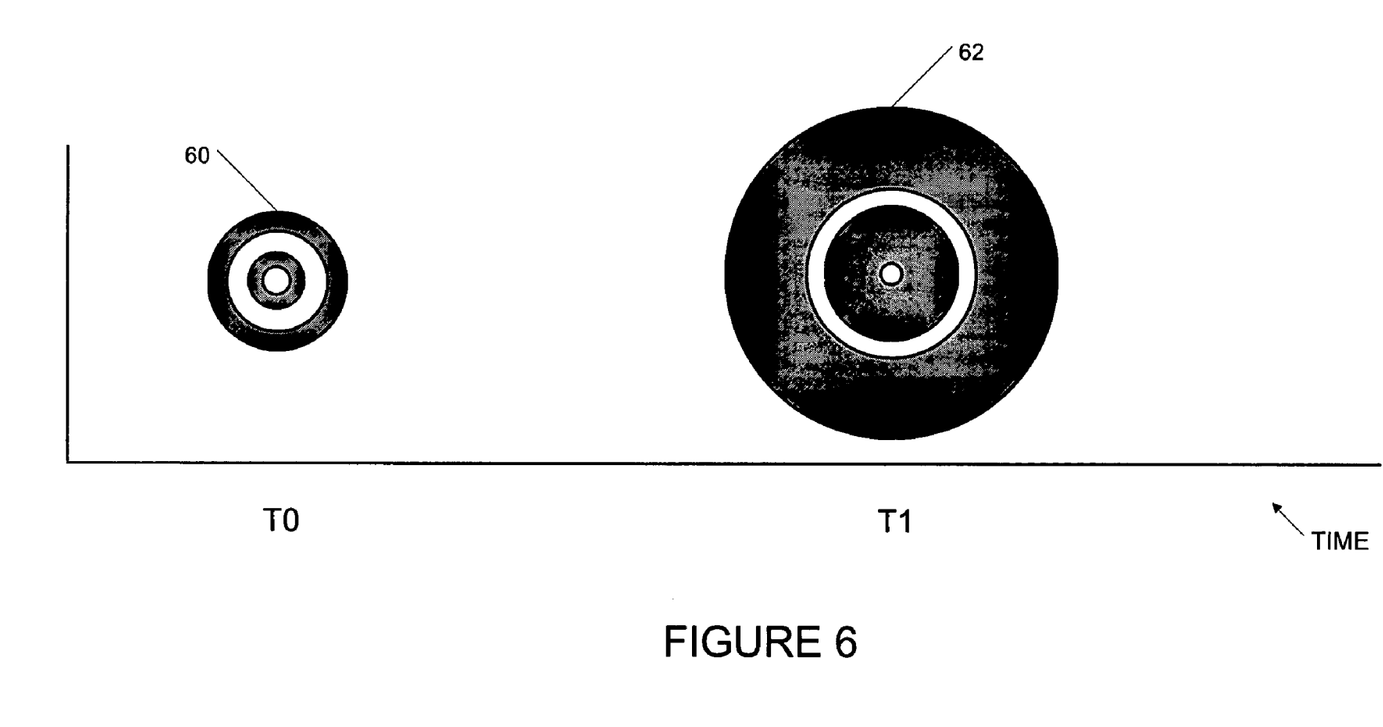
FIG. 6 shows an example of an evolution through time of a annular detection probability profile pattern which may be representative of multi-modal HF radio transmissions, or multi-modal acoustic transmissions through water.

Finally, FIG. 6 shows a annular detection probability profile pattern 60 at an instant T0 centered on a radial from an angular sensor. FIG. 6 further shows a annular detection probability profile pattern 62 at an instant T1. Such distribution would be representative of multi-modal HF radio transmissions, or multi-modal acoustic transmissions through water.

In one embodiment, the corresponding detection probability profile is received from a plurality of sensors tracking a target. Still in one embodiment, the detection status is obtained from each of the plurality of sensors tracking the target.

Now returning to FIG. 1 and according to step 12, the received corresponding probability profiles are combined to generate a global detection probability profile.

It will be appreciated that each individual time-corrected detection probability profile from each serviceable sensor is combined whether it has contact with the target-of-interest or not, to generate a composite detection probability profile from all of the available sensors. It will be appreciated that each individual detection probability profile is adjusted for the appropriate characteristics of the individual sensor, and the time since the sensor last had a detection ("Hit"). It will be further appreciated that the detection probability profile of a serviceable sensor without a "Hit" is assumed to be a "Correct rejection", and the sensor's detection probability profile is subtracted, rather than added, before being incorporated into the final solution.

It will be appreciated that a simple analogy of this situation would be the visual determination of the number on the hidden face of a die, once it has been cast. Assuming that the hidden number is a two and that the die is unbiased, the detection probability profile of each possible outcome is 1/6 with no time dependence. If each of the five visible faces were to be examined by the eye sensor, and the detection probability profile of each of these "not two" outcomes combined, this would lead to a 100% probability of correctly determining the invisible "two" outcome, even though the eye sensor never directly detected the "two" target-of-interest. In other words, the five "Correct rejections" led directly to a "Hit", even though no sensor actually experienced a "Hit" on the "two" target-of-interest. This simplistic analogy may be extended to much more complex detection probability profiles with time histories. In fact, as the number of sensors becomes large, the final (or global) detection probability profile can be approximated by simple addition or subtraction of the overlapping weighted detection probability profile values at each point. A more complex example of this method would be the determination of the location of a High Frequency (HF) radio transmitter using numerous non-directional receivers with simple "Hit" detectors. One versed in the art will be well aware that HF transmissions exhibit complex annular detection probability profiles that are strongly dependent on atmospheric and ionospheric conditions and the time of day. Nevertheless, these time dependent transmission characteristics are routinely characterized and forecast, with considerable accuracy. Accordingly, the best estimate of the target-of-interest transmitter's location can be obtained by overlaying the detection probability profiles of the "Hit" receivers and subtracting the weighted detection probability profiles of the "no-contact" receivers (which are assumed to be "Correct Rejections"), to yield a detection probability profile, or probability map, of the best estimate of the target-of-interest's location.

When a large number of sensors is used, a useful approximation for the probability of a target-of-interest detection at a specific point may be achieved by weighting and numerically summing the detection probability profiles at that point, although this simplification does not preclude the rigorous application of probability theory where warranted. The methods for combining probabilities are well known to those skilled in the art, and will not be repeated here. Graphically, the combination of the detection probability profiles can be visualized by the superimposition of the individual detection probability profile patterns. The key feature of the detection probability profile combination is that serviceable sensors that do not have a "Hit" are assumed to have a "Correct rejection" and their detection probability profile profiles are subtracted from the total detection probability profile field.

Figure 7:
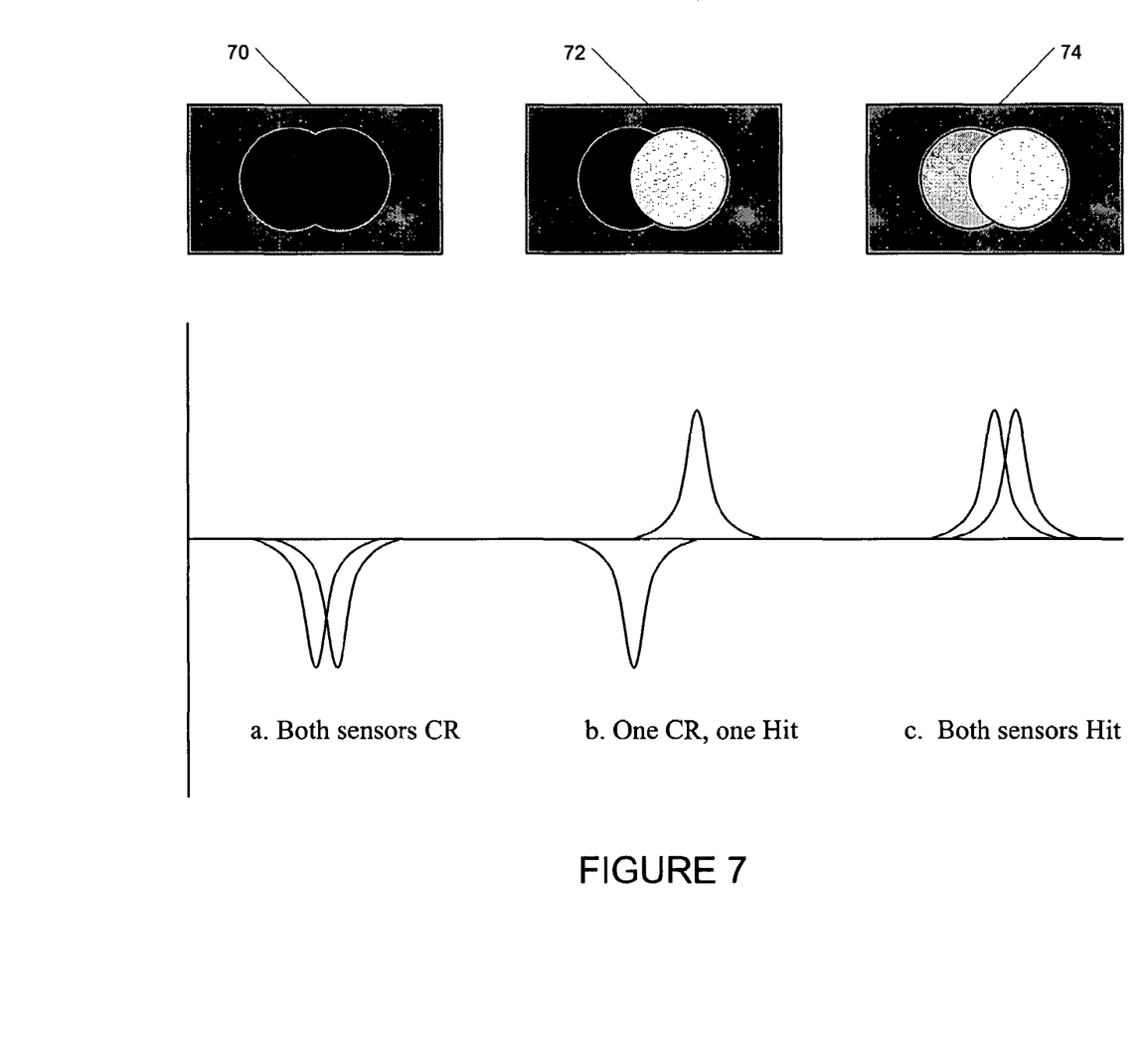
FIG. 7 illustrates the three possible detection probability profile combinations of "Hits" and "Correct rejections" from two sensors having circular detection probability profiles.

For instance, FIG. 7 illustrates the three possible detection probability profile combinations of "Hits" and "Correct Rejections" from two sensors with circular detection probability profiles. These are: "Hit"/"Hit"; "Hit"/"Correct rejection"; "Correct rejection"/"Correct rejection". The mid-grey background shading in the rectangles in FIG. 7 reflects the "Neutral" probability state of the system, where no sensor coverage exists. The shaded sensor circles illustrate either a "Hit" (lighter than neutral shading) or a "Correct Rejection" (darker than neutral shading). The overlap area in the Venn diagrams indicates the combination of the detection probability profiles (DPP).

It will be noted that the combined detection probability profiles can reinforce or negate the information from the individual sensors, as shown below:

| FIG. 7 Example | Sensor 1 DPP | Sensor 2 DPP | Consolidated DPP |
|---|---|---|---|
| a. | Correct rejection | Correct rejection | Strong CR in area of overlap<br>Mild CR elsewhere in circles<br>Neutral outside circles |
| b. | Correct rejection | Hit | Approximately neutral in area of overlap<br>Hit in right partial circle<br>CR on left partial circle.<br>Neutral outside circles |
| c. | Hit | Hit | Strong hit in overlap region<br>Hit elsewhere in circles<br>Neutral outside circles |

The same methodology may be applied for any number of sensors, and the resulting detection probability profile would be computed numerically from the individual time-variant detection probability profiles of each sensor. The resulting detection probability profile would reflect the system's best estimate of the target-of-interests position.

Referring back to FIG. 1 and according to step 14, a position of the target is estimated using the generated global detection probability profile.

Figure 2:
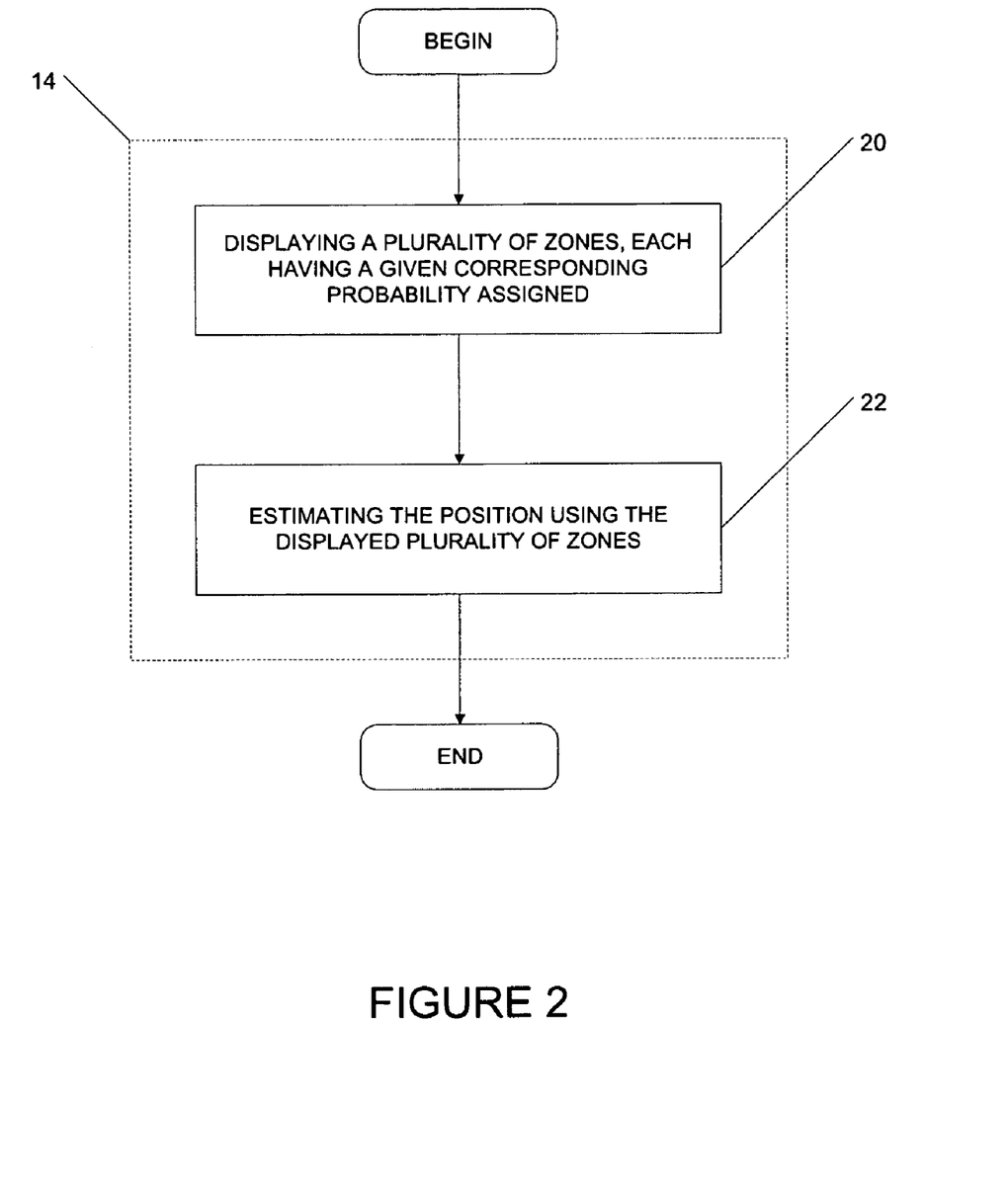
FIG. 2 is a flowchart which shows an embodiment for estimating the position of the target using the generated global detection probability profile.

Now referring to FIG. 2, there is shown an embodiment for estimating the position of the target using the generated global detection probability profile.

According to step 20, a plurality of zones, each having a givzen corresponding probability assigned is displayed. According to one embodiment, the plurality of zones is displayed on a user interface.

According to step 22, the position is estimated using the plurality of displayed zones.

In one embodiment, the position is estimated manually by an operator by observing the graphic display. In another embodiment, the position is estimated automatically using further algorithms using additional parameters such as for instance a possible speed of the target of interest, a past position, etc. which may help refine the search by eliminating non-viable probability areas. For example, the system may provide a global probability profile with two equally weighted "best estimates" of the Target Of Interest position, but one may differ sufficiently from the last position estimate so as to render it "unreasonable," and hence cause it to be rejected by the processor. The skilled addressee will appreciate that the additional parameters, such as maximum attainable velocity, will usually be dependent on the given target of interest.

In fact, a gain control mechanism is preferably used for estimating the position of the target.

The manual and automatic gain controls are used to optimize the appearance of the global detection probability profile from the combined sensors. The global detection probability profile is the pattern that results when the time-variant detection probability profiles from each sensor are numerically combined. The result is a graphical representation of detection probability profile levels, similar to a terrain contour map. The operator is primarily interested in the highest detection probability profile values corresponding to the peak probabilities of the location of the target-of-interest. This is analogous to searching for the mountain peaks on the contour map. Unfortunately, such peaks might correspond, in some cases, to a single pixel on a display, which would effectively render the highest probability region invisible to the operator. Conversely, for a global detection probability profile equivalent to gently rolling terrain, the operator would be faced with wide zones of "peak" detection probability profile, which would have little use for locating the target-of-interest. Both of these problems are addressed by the gain controls.

The gain control serves three functions. Firstly, it groups the continuously-variable detection probability profile values into discreet contour bands, equivalent to contour lines on a topographical map. Secondly, the gain control determines the scaling for each resulting band. Thirdly, the gain control automatically controls (AGC) or manually (MGC), how many of the resulting bands are shown on the display. Continuing with the topographical analogy above, the automatic mode of the gain control would display only the highest probability band, giving the best indication of the position of the target-of-interest. The manual gain control allows manual control of the display of different probability levels, ranging from only the highest band being displayed to all bands displayed. It will be appreciated that the mechanization and functioning of gain controls is well known to the ones skilled in the art.

It will be further appreciated that the method described below uses time-variant multi-sensor data to approximate the correct "Hit"/"Correct rejection" distribution while minimizing the "Misses" and "False Alarms".

It will be further appreciated that sensor signal characteristics are used to determine the location of a target-of-interest using both "Hit" and "Correct rejection" information. Simply stated, the algorithm incorporates the heretofore unused "where the target isn't" information to help determine "where the target is." This is done by applying weighted probabilities from each sensor, accounting for both "Hit" and "Correct rejection" information, to determine the highest-probability locus for the actual target position. It will be further appreciated that no distinction is made between "Hit" and "False Alarm" data, or "Miss" and "Correct Rejection" data, from a single sensor. They are simply categorized as "Hit" or "Correct Rejections" respectively, as long as the sensor is known to be serviceable. When sensors with overlapping coverage are trained on a target-of-interest, the "Hit" and "Correct rejection" data are refined and the "Miss" and "False alarm" percentages are reduced.

Figure 8:
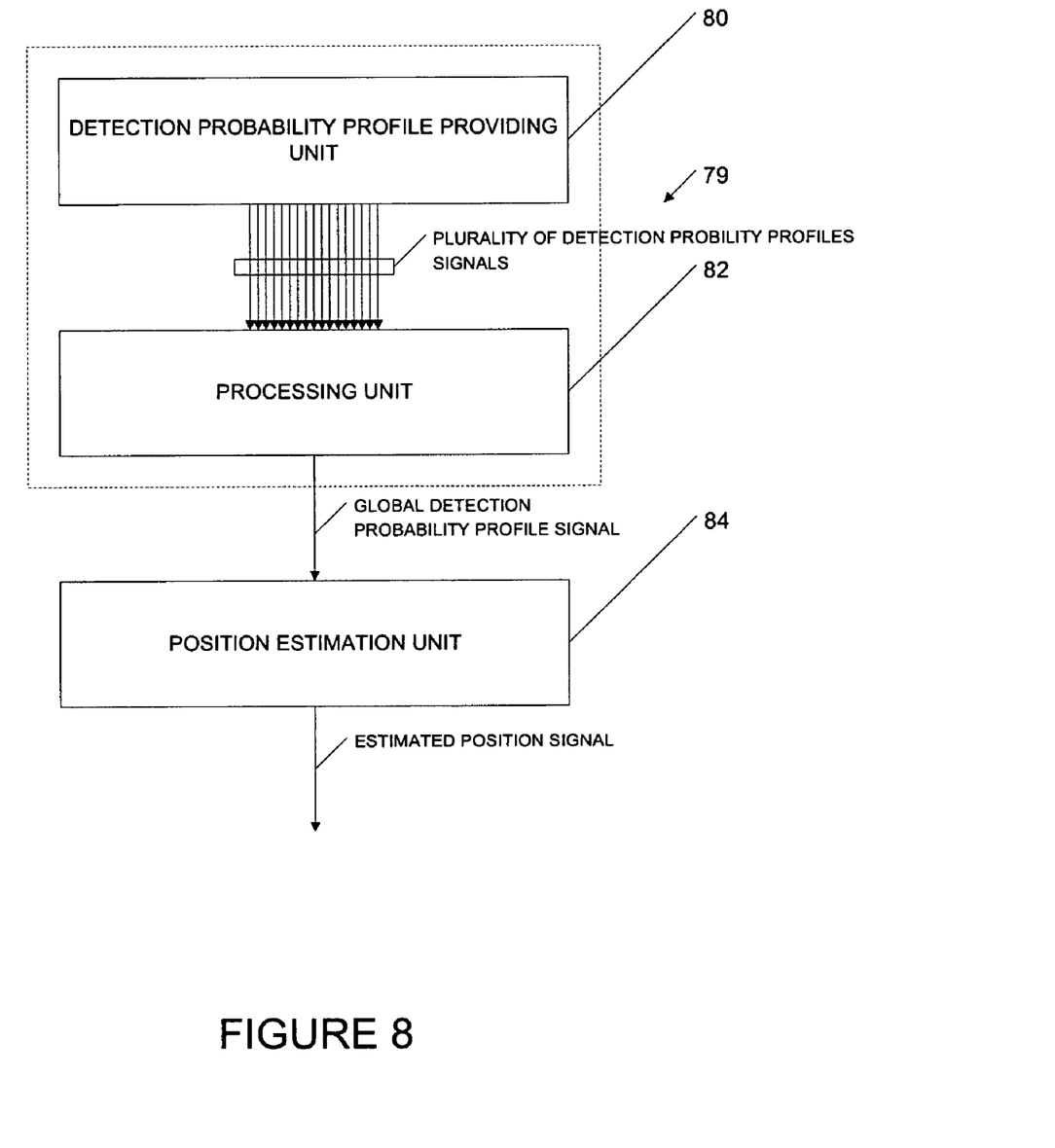
FIG. 8 is a block diagram showing an apparatus for providing an estimated position signal.

Now referring to FIG. 8, there is shown an embodiment of an apparatus 79 for providing an estimated position signal.

The apparatus 79 comprises a detection probability profile providing unit 80, a processing unit 82 and a position estimation unit 84.

The detection probability profile providing unit 80 provides a plurality of detection probability profiles signals to the processing unit 82. In one embodiment, the detection probability profile providing unit 80 comprises at least one interface suitable for receiving data from a plurality of sensors. The skilled addressee will therefore appreciate that the detection probability profile providing unit 80 is dependent on the plurality of sensors used as well as the type of output available for the sensors.

The processing unit 82 receives the plurality of detection probability profiles signals, and combines the plurality of detection probability profiles signals to provide a global detection probability profile signal. More precisely, the global detection probability profile signal is provided to the position estimation signal 14.

It will be appreciated that the combination is performed according to step 12 disclosed in FIG. 1.

The skilled addressee will understand that the type processing unit depends on various parameters comprising but not limited to, the number of sensor units to use, the output bandwidth of each sensor used, etc.

Accordingly, the processing unit 12 may be one of a dedicated ASIC, an FPGA, a motherboard comprising a processor manufactured by Intel™ or the like.

The position estimation unit 84 receives the global detection probability profile signal and estimates a position for the target of interest corresponding to the highest probability region(s) in the generated global probability profile and provides a corresponding estimated position signal.

It will be appreciated that in one embodiment, the position estimation unit comprises a processing unit, a display unit and a user interface, not shown in the figures, in the case where an operator is used to assist the detecting of the estimated position signal.

Figure 9:
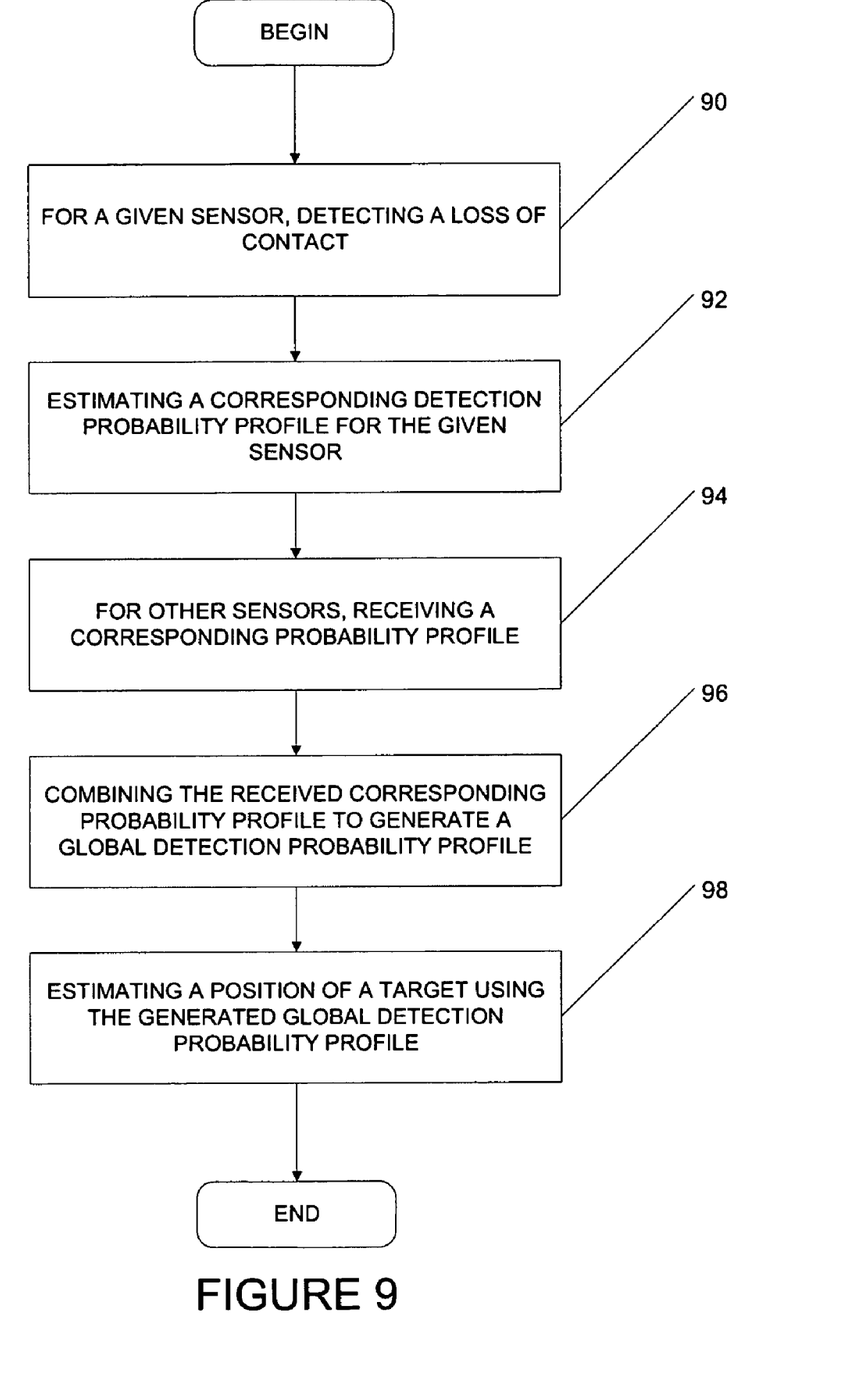
FIG. 9 is a flowchart showing an embodiment for estimating a position of the target in the case where a loss of contact of a target is detected for a given sensor.

Now referring to FIG. 9, there is shown an alternative embodiment for estimating a position of the target in the case where a loss of contact of a target is detected for a given sensor.

According to step 90, a loss of contact is detected for a given sensor. An indication of the loss of contact is provided by the detection probability profile providing unit 80 shown in FIG. 8 for a corresponding sensor in one embodiment. The skilled addressee will appreciated that the loss of contact may be the results of various events comprising but not limited to a failure of the sensor, the target of interest leaving a detection zone covered by the sensor, etc.

According to step 92, a corresponding detection probability profile is estimated for the given sensor.

The detection probability profile is estimated using a target-sensor velocity compensation.

More precisely, such compensation is automatically performed for each sensor in the following manner: all sensors respond to a "Hit" by displaying the appropriate detection probability profile, which represents the total uncertainty of the target-of-interest's position at the time of the "Hit". Once the sensor loses contact, the detection probability profile is expanded outwards at a rate corresponding to the geometric combination of the estimated target and sensor speeds, to account for the increasing positional uncertainty since the last "Hit". For example: in the simplest case, a fixed-position highly accurate sensor would exhibit a detection probability profile approximating a point in space when experiencing a "Hit". Once the signal is lost, the detection probability profile expands in a circular pattern to reflect the possible range of motion of the target. The resulting detection probability profile still represents valuable information about the target's location, particularly in the periods soon after the signal is first lost. Eventually, the detection probability profile distribution is sufficiently diluted that the detection probability profile effectively blends into the background noise, so the sensor reverts to the normal additive mode for detection probability profile combination (i.e., its detection probability profile is either added or subtracted from the total field, depending on whether it is in contact with the target-of-interest or not).

It will be appreciated by the skilled addressee that each individual sensor may have its own time-dilution properties, depending on the characteristic of the sensor and the maximum velocity of the target. In other words, the detection probability profile expands so that the target should lie within an area bounded by the original detection probability profile which reflects sensor's current accuracy bounds, expanded by the target's estimated displacement since the last "Hit".

According to step 94, a corresponding probability profile is received for other sensors.

According to step 96, the received corresponding probability profile is combined to generate a global detection probability profile.

According to step 98, a position of a target is estimated using the generated global detection probability profile.

It will be appreciated that a characteristic of the method disclosed above is the use of weighted non-detection information and multiple-independent-detection information as a means to refine the position solution.

The skilled addressee will appreciate that such method may be used to find the position/tracking the position of a target of interest which may be anyone of a moving vessel such as a submarine, an aircraft, a tank, an Intercontinental ballistic missile (ICBM) or the like.

While illustrated in the block diagrams as groups of discrete components communicating with each other via distinct data signal connections, it will be understood by those skilled in the art that the preferred embodiments are provided by a combination of hardware and software components, with some components being implemented by a given function or operation of a hardware or software system, and many of the data paths illustrated being implemented by data communication with in a computer application or operating system. The structure illustrated is thus provided for efficiency of teaching the present preferred embodiment.

It should be noted that the present invention can be carried out as a method, can be embodied in a system, a computer readable medium or an electrical or electromagnetic signal.

The embodiments of the invention described above are intended to be exemplary only. The scope of the invention is therefore intended to be limited solely by the scope of the appended claims.

I claim:

1. A method for estimating a position of a target of interest using a plurality of position detection sensors, said method comprising:

for at least one of said sensors, receiving a detection status from the sensor and obtaining a detection probability profile corresponding to the sensor, wherein said corresponding detection probability profile comprises a time-variant three-dimensional distribution defining the sensor's possible detection envelope and the computed probability of detection of the target of interest corresponding to each region of said envelope;

combining each of said corresponding detection status and said detection probability profiles to generate a global detection probability profile, said combining comprising probabilistically adding a first given probability profile in the case where a first given corresponding indication comprises a target detection, and probabilistically subtracting a second given probability profile in the case where a corresponding second given indication comprises a target non-detection; and estimating said position of said target corresponding to the highest probability region(s) in the generated global detection probability profile.

2. The method as claimed in claim 1, wherein said estimating of said position of said target comprises:

displaying a plurality of zones each having a given corresponding probability assigned using said detection probability profile; and estimating said position using said displayed plurality of zones.

3. The method as claimed in claim 2, wherein a given number of said plurality of zones is automatically displayed using an automatic gain control.

4. The method as claimed in claim 3, wherein said given number of said plurality of zones is manually selected.

5. The method as claimed in claim 3, wherein said given number of said plurality of zones is automatically selected.

6. The method as claimed in claim 1, wherein said detection probability profile comprises a circular normally distributed pattern.

7. The method as claimed in claim 1, wherein said detection probability profile comprises a normally distributed profile centered on a linear sensor pattern.

8. The method as claimed in claim 1, wherein said detection probability profile comprises a normally distributed pattern centered on a radial of an angular sensor.

9. The method as claimed in claim 1, wherein said detection probability profile comprises an annular detection probability profile centered on a radial of an angular sensor.

10. The method as claimed in claim 1, wherein said detection probability profile comprises an annular detection probability profile centered on a sensor.

11. The method as claimed in claim 1, wherein said detection status comprises one of "Hit" and "Correct Rejection".

12. An apparatus for providing an estimation of a position of a target of interest using inputs from a plurality of position detection sensors, said apparatus comprising:

a probability profile providing unit for providing a plurality of detection probability profile signals corresponding to each sensor, wherein each of said corresponding detection probability profile signals comprises a time-variant three-dimensional distribution defining the sensor's possible detection envelope and the computed probability of detection of the target of interest corresponding to each region of said envelope;

a processing unit receiving sensor detection status information and said provided plurality of detection probability profile signals and combining each of said corresponding detection probability profile signals to generate a global detection probability profile signal, said combining comprising probabilistically adding a first given probability profile signal in the case where a first given corresponding indication comprises a target detection, and probabilistically subtracting a second given probability profile signal in the case where a corresponding second given indication comprises a target non-detection; and a position estimating unit receiving said global detection probability profile signal and estimating said position of said target using at least said received global detection probability profile to provide said estimation of said position of said target of interest.

13. A method for estimating a position of a target of interest using a plurality of position detection sensors wherein a loss of contact with said target is detected for a given sensor, said method comprising:

estimating for said given sensor a corresponding time-variant detection probability profile comprising a three-dimensional distribution defining the given sensor's possible detection envelope and the computed probability of detection of the target of interest corresponding to each region of said envelope;

providing for other sensors a corresponding detection probability profile comprising a three-dimensional distribution defining the other sensor's possible detection envelope and the computed probability of detection of the target of interest corresponding to each region of said envelope;

combining each of said corresponding detection probability profiles to generate a global detection probability profile, said combining comprising probabilistically adding a first given probability profile in the case where a first given corresponding indication comprises a target detection, and probabilistically subtracting a second given probability profile in the case where a corresponding second given indication comprises a target non-detection; and estimating said position of said target corresponding to the highest probability region(s) using said generated global detection probability profile.

14. The method as claimed in claim 13, wherein said detection probability profile comprises a circular normally distributed pattern.

15. The method as claimed in claim 13, wherein said detection probability profile comprises a normally distributed profile centered on a linear sensor pattern.

16. The method as claimed in claim 13, wherein said detection probability profile comprises a normally distributed pattern centered on a radial of an angular sensor.

17. The method as claimed in claim 13, wherein said detection probability profile comprises an annular detection probability profile centered on a sensor.

18. The method as claimed in claim 13, wherein said detection probability profile comprises an annular detection probability profile centered on a radial of an angular sensor.

19. The method as claimed in claim 13, wherein said detection status comprises one of "Hit" and "Correct Rejection".

* * * * *